US009825317B2

(12) United States Patent
Maruo et al.

(10) Patent No.: US 9,825,317 B2
(45) Date of Patent: Nov. 21, 2017

(54) FUEL CELL SYSTEM AND CONTROL METHOD OF THE SAME

(71) Applicant: TOYOTA JIDOSHA KABUSHIKI KAISHA, Toyota-shi, Aichi-ken (JP)

(72) Inventors: Tsuyoshi Maruo, Toyota (JP); Yoshiaki Naganuma, Toyota (JP); Tomohiro Ogawa, Miyoshi (JP); Masashi Toida, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/921,309

(22) Filed: Oct. 23, 2015

(65) Prior Publication Data

US 2016/0141670 A1    May 19, 2016

(30) Foreign Application Priority Data

Nov. 13, 2014    (JP) ................................ 2014-230867

(51) Int. Cl.
    *H01M 8/04*       (2016.01)
    *H01M 8/0432*     (2016.01)
    *H01M 8/04119*    (2016.01)

(52) U.S. Cl.
    CPC ..... *H01M 8/0432* (2013.01); *H01M 8/04179* (2013.01)

(58) Field of Classification Search
    CPC .................. H01M 8/0432; H01M 8/04179
    See application file for complete search history.

(56) References Cited

U.S. PATENT DOCUMENTS

2009/0162710 A1 *   6/2009  Kajiwara ........... H01M 8/04119
                                                        429/415
2010/0266911 A1    10/2010  Aso

FOREIGN PATENT DOCUMENTS

| CN | 101849313 A | 9/2010 |
| JP | 2006-190616 A | 7/2006 |
| JP | 2009-117242 A | 5/2009 |
| JP | 2013-211163 | 10/2013 |

* cited by examiner

*Primary Examiner* — Mark F Huff
*Assistant Examiner* — Monique Wills
(74) *Attorney, Agent, or Firm* — Finnegan, Henderson, Farabow, Garrett & Dunner, LLP

(57) ABSTRACT

A fuel cell system 10 includes a fuel cell 20, gas supply systems 30, 40, which supply gases to the fuel cell 20, and a controller 60, which controls the gas supply systems 30, 40. During a non-operation period of the fuel cell 20, the controller 60 controls the gas supply systems 30, 40 to carry out the scavenging treatment. If the scavenging treatment is interrupted by an operation performed by a user, then the controller 60 controls the gas supply systems 30, 40 and restarts the scavenging treatment after a predetermined time elapses from the interruption.

5 Claims, 2 Drawing Sheets

FUEL CELL SYSTEM AND CONTROL METHOD OF THE SAME

BACKGROUND OF THE INVENTION

Field of the Invention

The present invention relates to a fuel cell system and a control method of the same.

Background Art

Hitherto, a fuel cell system provided with a fuel cell adapted to receive the supply of reactant gases (a fuel gas and an oxidizing gas) to generate power has been proposed and in practical use. A fuel cell is a power generation system which oxidizes a fuel by an electrochemical process so as to directly convert the energy released by the oxidation reaction into electric energy. When power is generated by such a fuel cell system, water is generated inside the fuel cell by the electrochemical reaction. There are cases where the generated water is retained in a reactant gas flow path in the fuel cell, blocking the flows of the reactant gases. Further, when the fuel cell system is operated in a low temperature environment of a freezing point or the like, the water remaining in the electrodes (a catalyst layer or a diffusion layer) of the fuel cell freezes, causing marked deterioration in the startup performance thereof.

Currently, in order to solve various problems attributable to the water generated in a fuel cell, there has been proposed a technology for supplying dry oxygen or dry hydrogen to a reactant gas flow path while the operation of a fuel cell is stopped, thereby carrying out a scavenging treatment to reduce the water in a gas flow path in the fuel cell or the moisture on a valve and the like of a fuel cell system (refer to, for example, Patent Document 1). According to the technology described in Patent Document 1, the timing of a scavenging treatment is supposed to be adjustable according to an outside air temperature or a fuel cell temperature.

CITATION LIST

Patent Document(s)

[Patent Document 1] JP2013-211163A

To carry out an automated scavenging treatment during a non-operation period of a fuel cell, as described in Patent Document 1, it is legally required to incorporate a mechanism in a system thereby to interrupt the automated scavenging treatment by an operation performed by a user. In the case where the automated scavenging treatment is interrupted by a user performing the operation (e.g. turning on an ignition or opening a tank lid), if the scavenging treatment is restarted immediately after the interruption, then the user may experience discomfort, getting an impression that the fuel cell system has carried out the processing counter to his or her operation.

SUMMARY OF THE INVENTION

The present invention has been made in view of the background described above, and an object of the invention is to provide a fuel cell system capable of restarting a scavenging treatment without causing user discomfort when the scavenging treatment during a non-operation period of a fuel cell is interrupted by an operation performed by the user.

To this end, a fuel cell system in accordance with the present invention includes: a fuel cell; a gas supply system that supplies a gas to the fuel cell; and a controller that controls the gas supply system, wherein the controller controls the gas supply system to carry out a scavenging treatment during a non-operation period of the fuel cell and, in the case where the scavenging treatment is interrupted by an operation performed by a user, the controller controls the gas supply system to restart the scavenging treatment after a predetermined time elapses from the interruption.

Further, a control method in accordance with the present invention is a control method of a fuel cell system for carrying out a scavenging treatment during a non-operation period of a fuel cell, wherein, in the case where the scavenging treatment is interrupted by an operation performed by a user, the scavenging treatment is restarted after a predetermined time elapses from the interruption.

Adopting the configuration and the method described above makes it possible to restart a scavenging treatment after a predetermined time elapses from an interruption of the scavenging treatment in the case where the scavenging treatment carried out during a non-operation period of a fuel cell is interrupted by an operation performed by a user. Hence, the scavenging treatment can be prevented from being restarted immediately following an interruption, thus allowing the scavenging treatment to be carried out without causing user discomfort (i.e. without causing the user to feel that a fuel cell system has carried out processing counter to his or her operation).

The fuel cell system in accordance with the present invention may be provided with an outside air temperature detector, which detects the outside air temperature during the non-operation period of the fuel cell. In such a case, a controller may be adopted, which causes the scavenging treatment to be carried out when an outside air temperature detected by the outside air temperature detector is below a predetermined temperature.

With this arrangement, the scavenging treatment can be automatically carried out when the outside air temperature falls (e.g. below zero degrees Celsius) during the non-operation period of the fuel cell. Therefore, the volume of water in the fuel cell not in operation can be reduced in a low temperature environment, making it possible to prevent the occurrence of deteriorated startup performance attributable to the freezing of the water in the fuel cell caused by a decrease in the outside air temperature.

The fuel cell system in accordance with the present invention may adopt a controller that sets the time, which is required to restart the scavenging treatment from an interruption of the scavenging treatment made by an operation performed by a user, according to an outside air temperature detected by the outside air temperature detector.

With this arrangement, the time required for the scavenging treatment to be restarted following an interruption of the scavenging treatment made by an operation by the user (the scavenging interruption time) can be set according to an outside air temperature. Hence, if, for example, an outside air temperature is relatively low, then the scavenging interruption time can be set to be relatively short so as to restart the scavenging treatment relatively soon, thus making it possible to suppress the freezing of the water in the fuel cell caused by a decrease in the outside air temperature.

The fuel cell system in accordance with the present invention may adopt a controller that sets the time, which is required for the scavenging treatment to be restarted from an interruption of the scavenging treatment made by the operation performed by a user, according to an identified type of operation performed by the user.

With this arrangement, the time required for the scavenging treatment to be restarted following an interruption of the scavenging treatment made by an operation by the user (the scavenging interruption time) can be set according to the type of operation performed by the user. Hence, if a type of operation which suggests that a user will leave relatively soon from his or her operation place is identified (e.g. if the user turns on an ignition to interrupt the scavenging treatment and then immediately turns off the ignition, or if the user opens a tank lid to interrupt the scavenging treatment and then immediately closes the tank lid), then the scavenging interruption time can be set to be relatively short so as to restart the scavenging treatment relatively soon. Meanwhile, if a type of operation which suggests that the user will stay relatively long at his or her operation place is identified (e.g. if the user turns on the ignition to interrupt the scavenging treatment and does not turn off the ignition for a predetermined time or longer, or if the user opens the tank lid to interrupt the scavenging treatment and does not dose the tank lid for a predetermined time or longer), then the scavenging interruption time can be set to be relatively long so as to delay the restart of the scavenging treatment.

The present invention makes it possible to provide a fuel cell system capable of restarting a scavenging treatment without causing user discomfort when the scavenging treatment during a non-operation period of a fuel cell is interrupted by an operation performed by the user.

DESCRIPTION OF THE PREFERRED EMBODIMENTS

Figure 1:
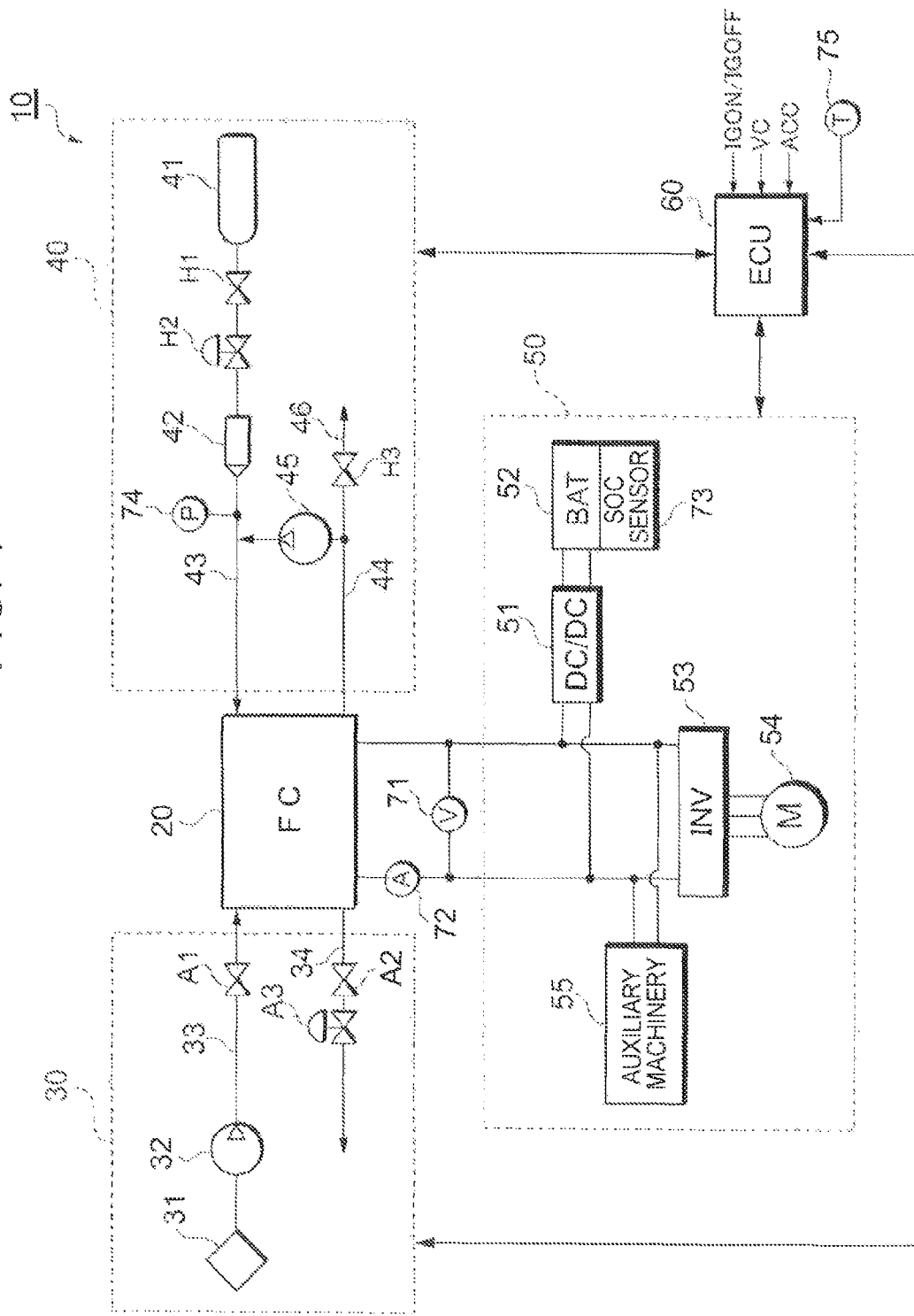
FIG. 1 is a block diagram schematically illustrating the configuration of a fuel cell system according to an embodiment of the present invention.

The following will describe an embodiment of the present invention with reference to the accompanying drawings. Unless otherwise specified, the positional relationship among the top, bottom, left, right and the like in the drawings, is based on the positional relationship illustrated in the drawings. Further, the dimensional ratios of the drawings are not limited to the ratios illustrated in the drawings. In addition, the following embodiment is exemplary of the present invention, and the present invention is not meant to be limited only to the embodiment. Further, the present invention is intended to cover various modifications unless the modifications depart from the spirit thereof.

Referring first to FIG. 1, the configuration of a fuel cell system 10 according to the present embodiment will be described. The fuel cell system 10 functions as, for example, an in-vehicle power system installed in a fuel cell vehicle as a mobile body. The fuel cell system 10 includes a fuel cell 20, which receives the supply of reactant gases (a fuel gas and an oxidizing gas) to generate power, an oxidizing gas supply system 30, which supplies air as the oxidizing gas to the fuel cell 20, a fuel gas supply system 40, which supplies a hydrogen gas as the fuel gas to the fuel cell 20, a power system 50, which controls the charge and discharge of power, and a controller 60, which integrally controls the entire system.

The fuel cell 20 is a solid polyelectrolyte type cell stack composed of a large number of cells stacked in series. In the fuel cell 20, the oxidation reaction represented by expression (1) takes place at an anode electrode, while a reduction reaction represented by expression (2) takes place at a cathode electrode. In the entire fuel cell 20, an electrogenic reaction represented by expression (3) takes place.

$$H_2 \rightarrow 2H^+ + 2e^- \qquad (1)$$

$$(1/2)O_2 + 2H^+ + 2e^- \rightarrow H_2O \qquad (2)$$

$$H_2 + (1/2)O_2 \rightarrow H_2O \qquad (3)$$

Each of the cells constituting the fuel cell 20 is composed of a polyelectrolyte membrane, an anode electrode, a cathode electrode, and separators. The anode electrode and the cathode electrode hold the polyelectrolyte membrane from both sides, forming a sandwich construction. The separators, which are made of a gas impermeable conductive member, hold the anode electrode and the cathode electrode from both sides, forming the flow paths of the fuel gas and the oxidizing gas between the anode electrode and the cathode electrode.

Each of the anode electrode and the cathode electrode has a catalyst layer and a gas diffusion layer. The catalyst layer has catalyst carrying carbon which carries, for example, platinum-based noble metal particles, which function as a catalyst, and a polyelectrolyte. As the platinum-based material of the noble metal particles, a metal catalyst (Pt, Pt—Fe, Pt—Cr, Pt—Ni, Pt—Ru, or the like), for example, may be used. As the catalyst carrying carbon, carbon black, for example, may be used. As the polyelectrolyte, a proton conducting ion-exchange resin or the like may be used. The gas diffusion layer formed on a surface of the catalyst layer has both air permeability and electronic conductivity and is composed of carbon cloth woven using a thread made of a carbon fiber, carbon paper or carbon felt.

The polyelectrolyte membrane is a proton conducting ion-exchange membrane made of a solid polymer material, such as a fluorine-based resin, and exhibits high electrical conductivity in a wet state. The polyelectrolyte membrane, the anode electrode, and the cathode electrode constitute a membrane-electrode assembly.

As illustrated in FIG. 1, the fuel cell 20 is provided with a voltage sensor 71 for detecting the output voltage of the fuel cell 20 (FC voltage) and a current sensor 72 for detecting the output current thereof (FC current).

The oxidizing gas supply system 30 has an oxidizing gas passage 33, through which the oxidizing gas to be supplied to the cathode electrode of the fuel cell 20 flows, and an oxidizing off-gas passage 34, through which an oxidizing off-gas to be exhausted from the fuel cell 20 flows. The oxidizing gas passage 33 is provided with an air compressor 32, which draws in the oxidizing gas from the atmospheric air through a filter 31, and a shutoff valve A1 for shutting off the supply of the oxidizing gas to the fuel cell 20. The oxidizing off-gas passage 34 is provided with a shutoff valve A2 for shutting off the discharge of the oxidizing off-gas from the fuel cell 20, and a back-pressure regulator A3 for adjusting an oxidizing gas supply pressure.

The fuel gas supply system 40 has a fuel gas supply source 41, a fuel gas passage 43, through which a fuel gas to be supplied to the anode electrode of the fuel cell 20 from the fuel gas supply source 41 flows, a circulation passage 44 for returning the fuel off-gas discharged from the fuel cell 20 to the fuel gas passage 43, a circulation pump 45 that pressure-feeds the fuel off-gas in the circulation passage 44 to the fuel gas passage 43, and an exhaust and drain passage 46 branching connected to the circulation passage 44.

The fuel gas supply source 41 is composed of, for example, a high-pressure hydrogen tank or a hydrogen storing alloy, and stores a high-pressure (e.g. 35 MPa to 70 MPa) hydrogen gas. When the shutoff valve H1 is opened, a fuel gas flows out into the fuel gas passage 43 from the fuel gas supply source 41. The pressure of the fuel gas is decreased to, for example, approximately 200 kPa by a regulator H2 or an injector 42 before the fuel gas is supplied to the fuel cell 20.

The exhaust and drain passage 46 branched from the circulation passage 44 is connected to the circulation passage 44. The exhaust and drain passage 46 is provided with an exhaust and drain valve H3. The exhaust and drain valve H3 is actuated in response to a command from the controller 60 to discharge the water and the fuel off-gas containing impurities from the circulation passage 44 to the outside.

The fuel off-gas discharged through the exhaust and drain valve H3 is mixed with the oxidizing off-gas that flows through the oxidizing off-gas passage 34 and the mixture is diluted by a diluter (not illustrated). The circulation pump 45 circulates and supplies the fuel off-gas in a circulation system to the fuel cell 20 by driving a motor.

The power system 50 has a DC-DC converter 51, a battery 52, a traction inverter 53, a traction motor 54, and auxiliary machinery 55. The DC-DC converter 51 has a function for boosting the DC voltage supplied from the battery 52 and outputting the boosted DC voltage to the traction inverter 53 and a function for stepping down the DC power generated by the fuel cell 20 or the regenerative power collected by the traction motor 54 from regenerative braking and for charging the battery 52 with the stepped-down power.

The battery 52 functions mainly as a storage source of surplus power, a regenerative energy storage source at regenerative braking, and an energy buffer at load fluctuations when the fuel cell vehicle accelerates or decelerates. The battery 52 ideally uses a secondary battery, such as a nickel-cadmium storage battery, a nickel-hydrogen storage battery, or a lithium secondary battery. The battery 52 is provided with a SOC sensor 73 for detecting the state of charge (SOC), which indicates the residual capacity thereof.

The traction inverter 53 is, for example, a PWM inverter driven in a pulse width modulation mode, and converts the DC voltage output from the fuel cell 20 or the battery 52 into a three-phase AC voltage to control the rotation torque of the traction motor 54 according to a control command from the controller 60. The traction motor 54 is, for example, a three-phase AC motor, and constitutes the motive power source of the fuel cell vehicle.

The auxiliary machinery 55 collectively refers to the motors disposed at sections in the fuel cell system 10, the inverters for driving the motors, and various types of in-vehicle auxiliary machines (e.g. the air compressor 32, the injector 42, the circulation pump 45, a radiator, and a cooling water circulation pump).

The controller 60 is a computer system provided with a CPU, a ROM, a RAM and an input-output interface, and controls each section of the fuel cell system 10. For example, upon receipt of a startup signal IG output from an ignition switch, the controller 60 starts the operation of the fuel cell system 10 and determines the power required for the entire system on the basis of an accelerator opening signal ACC output from an accelerator sensor, a vehicle speed signal VC output from a vehicle speed sensor, or the like. The required power for the entire system is the total value of the power for vehicle travel and the power for the auxiliary machines.

The power for the auxiliary machines mainly includes the power consumed by the in-vehicle auxiliary machinery (the air compressor 32, the circulation pump 45, the cooling water circulation pump, and the like), the power consumed by devices necessary for vehicle travel (a transmission, a wheel controller, a steering device, a suspension, and the like), and the power consumed by devices disposed in a passenger space (an air conditioner, lighting fixtures, an audio device, and the like).

The controller 60 determines the allocation of the output power from each of the fuel cell 20 and the battery 52, controls the oxidizing gas supply system 30 and the fuel gas supply system 40 such that the amount of power generated by the fuel cell 20 coincides with a desired amount of power, and also controls the DC-DC converter 51 to adjust the output voltage of the fuel cell 20, thereby controlling the operation point (the output voltage and the output current) of the fuel cell 20.

In the fuel cell 20 when the fuel cell system 10 is in operation, the hydrogen ions generated at the anode electrode pass through the electrolyte membrane and move to the cathode electrode, as indicated by expression (1) given above. The hydrogen ions that have reached the cathode electrode cause the electrochemical reaction with the oxygen in the oxidizing gas supplied to the cathode electrode and also cause the reduction reaction of the oxygen to take place, producing water, as indicated by expression (2) given above.

Further, the controller 60 is connected to a temperature sensor (outside air temperature detector) 75, which detects the outside air temperature during the non-operation period of the fuel cell 20. The controller 60 receives an input of information on an outside air temperature detected by the temperature sensor 75, and causes the scavenging treatment to be carried out during the non-operation period of the fuel cell 20. More specifically, if the outside air temperature detected by the temperature sensor 75 falls below a predetermined temperature (e.g. zero degrees Celsius), then the controller 60 controls the drive of the air compressor 32, the shutoff valve A1, the shutoff valve H1, the regulator H2, the injector 42 and the like to supply the gases, namely, the oxidizing gas and the fuel gas, into the fuel cell 20 thereby to carry out the scavenging treatment for draining the water in the fuel cell 20 to the outside. The duration time of the scavenging treatment by the controller 60 (the scavenging duration time) can be set in advance.

Further, if a particular operation performed by a user (e.g. turning on the ignition or opening the tank lid) is detected during the scavenging treatment, then the controller 60 controls the shutoff valve A1, the shutoff valve H1 or the like to interrupt the scavenging treatment. When the scavenging treatment is interrupted by an operation performed by the user, the controller 60 restarts the scavenging treatment after a predetermined time elapses following the interruption.

The controller 60 in the present embodiment sets the time (the scavenging interruption time) required for the scavenging treatment to be restarted after the interruption of the scavenging treatment caused by an operation performed by a user, according to an outside air temperature detected by the temperature sensor 75. For example, if the outside air temperature detected by the temperature sensor 75 is a predetermined determination temperature (e.g. −30 degrees Celsius) or more, then the controller 60 sets the scavenging interruption time to a specified time (e.g. 10 minutes). Meanwhile, if the outside air temperature detected by the temperature sensor 75 is below the foregoing determination temperature, then the controller 60 sets the scavenging interruption time to a time that is shorter than the foregoing specified time (e.g. 5 minutes).

Figure 2:
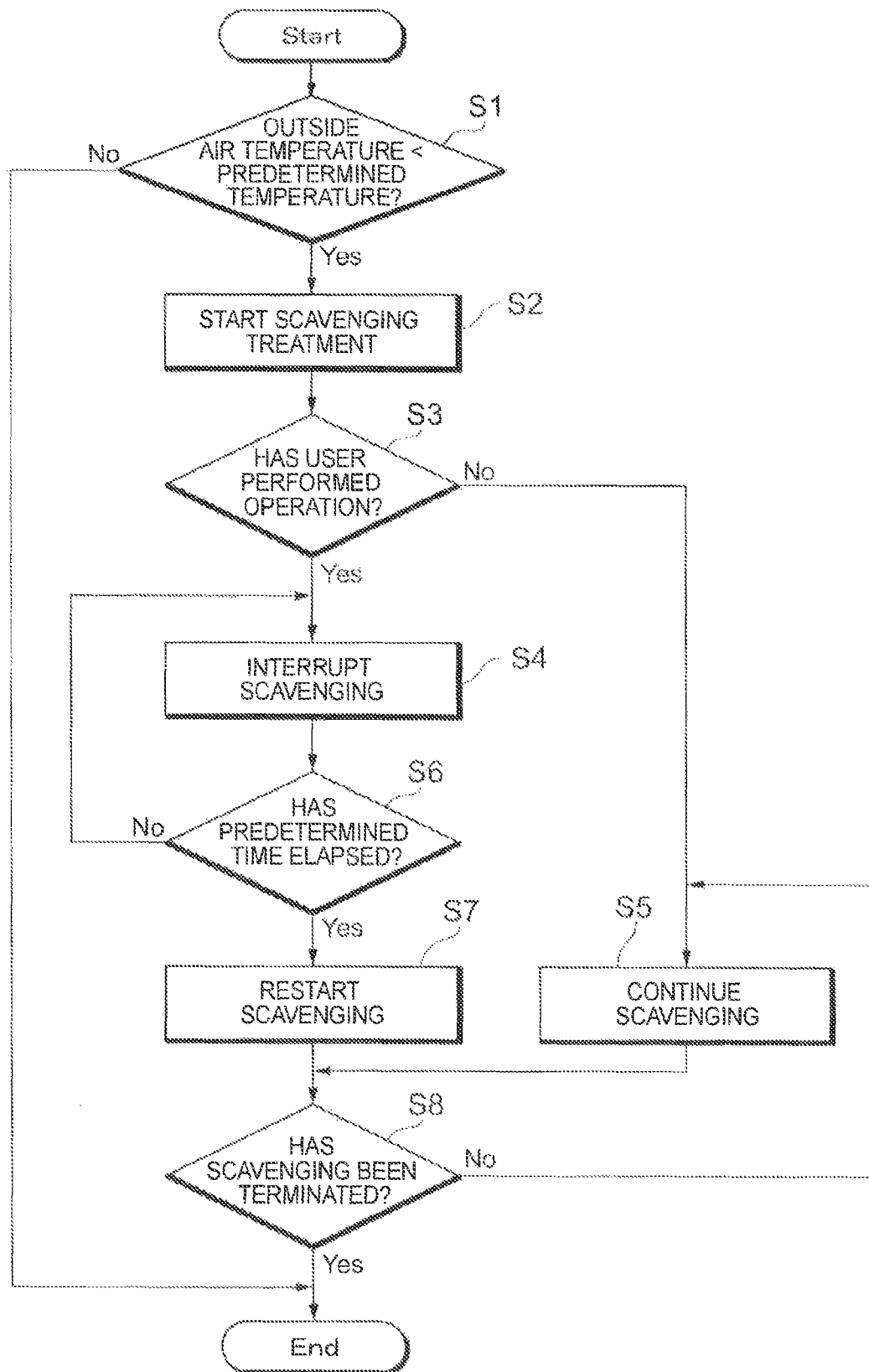
FIG. 2 is a flowchart illustrating a control method of the fuel cell system according to the embodiment of the present invention.

Referring now to the flowchart of FIG. 2, the control method related to the scavenging treatment of the fuel cell system 10 according to the present embodiment will be described.

In the normal operation of the fuel cell system 10, the fuel gas is supplied from the fuel gas supply source 41 to the anode electrode of the fuel cell 20 through the fuel gas passage 43, and the oxidizing gas is supplied to the cathode electrode of the fuel cell 20 through the oxidizing gas passage 33, thereby generating power. At this time, the amount of power to be drawn out from the fuel cell 20 (the required power) is calculated at the controller 60, and the fuel gas and the oxidizing gas of the amounts based on the calculated amount of power to be generated are supplied into the fuel cell 20. In the normal operation, the interior of the fuel cell 20 is wet, so that stopping the operation causes the water to remain in the fuel cell 20. For this reason, in the present embodiment, the scavenging treatment is carried out during the non-operation period of the normal operation in order to suppress the freezing of the water in the fuel cell 20 in a low temperature environment.

First, the controller 60 of the fuel cell system 10 determines whether the outside air temperature detected by the temperature sensor 75 is below a predetermined temperature (outside air temperature determination step: S1). If the controller 60 determines that the detected outside air temperature is below the predetermined temperature, then the controller 60 drives the air compressor 32, the injector 42 or the like to supply the gases, namely, the oxidizing gas and the fuel gas, into the fuel cell 20 so as to start the scavenging treatment for draining the water in the fuel cell 20 to the outside (scavenging start step: S2). Meanwhile, if the controller 60 determines that the detected outside air temperature is the predetermined temperature or more, then the controller 60 terminates the control without carrying out the scavenging treatment.

Next, the controller 60 determines whether a user has performed a particular operation (e.g. turning on the ignition or opening the tank lid) during the scavenging treatment (operation determination step: S3). If the controller 60 determines that the user has performed a particular operation during the scavenging treatment, then the controller 60 controls the shutoff valve A1, the shutoff valve H1 or the like to interrupt the scavenging treatment (scavenging interruption step: S4). Meanwhile, if the controller 60 does not detect any particular operation performed by the user during the scavenging treatment, then the controller 60 continues the scavenging treatment until a predetermined end condition is satisfied (scavenging continuation step: S5).

After interrupting the scavenging treatment following the detection of a particular operation performed by the user during the scavenging treatment, the controller 60 determines whether the scavenging interruption time has exceeded a predetermined time (e.g. a time set according to the outside air temperature detected by the temperature sensor 75) (interruption time determination step: S6). If the controller 60 determines that the scavenging interruption time has exceeded the predetermined time, then the controller 60 drives the air compressor 32, the injector 42 or the like again to restart the scavenging treatment (scavenging restart step: S7).

Thereafter, the controller 60 determines whether the predetermined end condition has been satisfied (end determination step: S8). If it is determined that the end condition has not been satisfied, then the controller 60 continues the scavenging treatment. Meanwhile, if it is determined that the predetermined end condition has been satisfied, then the controller 60 terminates the scavenging treatment. The end condition may be that, for example, (1) the preset scavenging continuation time (e.g. 5 minutes) has elapsed or (2) the outside air temperature detected by the temperature sensor 75 has reached the predetermined temperature or more.

According to the embodiment described above, in the case where the scavenging treatment carried out during the non-operation period of the fuel cell 20 is interrupted by an operation performed by the user, the fuel cell system 10 makes it possible to restart the scavenging treatment after the predetermined time elapses from the interruption. This makes it possible to prevent the scavenging treatment from being restarted immediately after an interruption, so that the scavenging treatment can be carried out without causing user discomfort (without giving the user an impression that the fuel cell system 10 has carried out processing counter to his or her operation).

Further, in the fuel cell system 10 according to the embodiment described above, the scavenging treatment can be automatically carried out when the outside air temperature decreases (e.g. below zero degrees Celsius) during the non-operation period of the fuel cell 20. Hence, the volume of water in the fuel cell 20 during the non-operation period in a low temperature environment can be reduced, thus making it possible to prevent the startup performance from deteriorating due to the freezing of the water in the fuel cell 20 caused by a decrease in the outside air temperature.

Further, in the fuel cell system 10 according to the embodiment described above, the time required from the moment of an interruption of the scavenging treatment caused by an operation performed by a user to a restart of the scavenging treatment (the scavenging interruption time) can be set according to an outside air temperature. Therefore, if the outside air temperature is relatively low, then the scavenging interruption time can be set to be relatively short so as to restart the scavenging treatment relatively soon, thus making it possible to suppress the freezing of the water in the fuel cell 20 caused by a decrease in the outside air temperature.

The present embodiment illustrates the example in which the scavenging interruption time is set according to an outside air temperature; however, the method of setting the scavenging interruption time is not limited thereto. Alternatively, for example, the controller 60 may be adapted to identify the type of an operation performed by a user and to set the scavenging interruption time according to the identified type of the operation performed by the user.

Using such a configuration allows the scavenging interruption time to be set according to the type of an operation performed by a user. For example, if an identified type of an operation suggests that a user will leave relatively soon from his or her operation place (e.g. if the user turns on an ignition to interrupt the scavenging treatment and then immediately turns off the ignition, or if the user opens a tank lid to interrupt the scavenging treatment and then immediately closes the tank lid), then the scavenging interruption time can be set to be relatively short so as to restart the scavenging relatively soon. Meanwhile, if an identified type of an operation suggests that the user will stay relatively long at his or her operation place (e.g. if the user turns on the ignition to interrupt the scavenging treatment and does not turn off the ignition for a predetermined time or longer, or if the user opens the tank lid to interrupt the scavenging treatment and does not close the tank lid for a predetermined time or longer), then the scavenging interruption time can be set to be relatively long so as to delay the restart of the scavenging treatment.

The present embodiment has used the fuel cell vehicle as a mobile body. However, the fuel cell system in accordance with the present invention can be installed in a variety of mobile bodies other than a fuel cell vehicle, such as a robot, a ship, an aircraft or the like.

The present invention is not limited to the embodiments described above, and modifications obtained by persons skilled in the art by adding design changes as appropriate to the embodiments are to be embraced in the scope of the present invention insofar as such modifications include the features of the present invention. More specifically, the elements provided in the foregoing embodiments, and the placement, the materials, the conditions, the shapes, the sizes, and the like thereof can be changed as appropriate rather than being limited to those illustrated in the embodiments. Further, the elements provided in the embodiments can be combined insofar as technically possible, and the results of the combinations are to be embraced in the scope of the present invention insofar as the results of the combinations include the features of the present invention.

DESCRIPTION OF REFERENCE NUMERALS

10: fuel cell system
60: controller
75: temperature sensor (outside air temperature detector)

What is claimed is:

1. A fuel cell system comprising:
a fuel cell;
a gas supply system that supplies a gas to the fuel cell; and
a controller that controls the gas supply system, wherein the controller is programmed to:
control the gas supply system to carry out a scavenging treatment during a non-operation period of the fuel cell,
determine that the scavenging treatment has been interrupted by an operation performed by a user, and
control the gas supply system to restart the scavenging treatment when the scavenging treatment has been interrupted for greater than a predetermined time.

2. The fuel cell system according to claim 1, comprising:
an outside air temperature detector that detects the outside air temperature during the non-operation period of the fuel cell,
wherein the controller causes the scavenging treatment to be carried out in the case where an outside air temperature detected by the outside air temperature detector is below a predetermined temperature.

3. The fuel cell system according to claim 2, wherein the controller sets a time, which is required to restart the scavenging treatment from an interruption of the scavenging treatment made by an operation performed by a user, according to an outside air temperature detected by the outside air temperature detector.

4. The fuel cell system according to claim 1, wherein the controller sets a time, which is required for the scavenging treatment to be restarted from an interruption of the scavenging treatment made by an operation performed by a user, according to an identified type of the operation performed by the user.

5. A control method of a fuel cell system for carrying out a scavenging treatment during a non-operation period of a fuel cell, comprising:
determining that a scavenging treatment has been interrupted by an operation performed by a user, and
restarting the scavenging treatment when the scavenging treatment has been interrupted for greater than a predetermined time.

* * * * *